United States Patent
Hung et al.

(10) Patent No.: US 7,844,375 B2
(45) Date of Patent: Nov. 30, 2010

(54) VEHICLE HYBRID POWER SYSTEM AND METHOD FOR CREATING SIMULATED EQUIVALENT FUEL CONSUMPTION MULTIDIMENSIONAL DATA APPLICABLE THERETO

(75) Inventors: Yi-Hsuan Hung, Hsinchu (TW);
Po-Hsu Lin, Taichung (TW);
Chien-Hsun Wu, Taipei (TW);
Chuang-Pin Chiu, Taoyuan (TW); E-In Wu, Taipei (TW); Tsu-Yang Tsai, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 461 days.

(21) Appl. No.: 12/057,981

(22) Filed: Mar. 28, 2008

(65) Prior Publication Data

US 2009/0150016 A1    Jun. 11, 2009

(30) Foreign Application Priority Data

Dec. 7, 2007 (TW) .............................. 96146682 A (51) Int. Cl.
*B60W 10/00* (2006.01)
*B60W 20/00* (2006.01)
*B60W 50/04* (2006.01)

(52) U.S. Cl. .................. 701/22; 180/65.265; 903/914; 903/930

(58) Field of Classification Search ....... 180/65.1–65.8; 701/22

See application file for complete search history.

(56) References Cited

U.S. PATENT DOCUMENTS 5,820,172 A * 10/1998 Brigham et al. .......... 290/40 C
6,201,312 B1 * 3/2001 Shioiri et al. ............. 290/40 C
6,276,472 B1 * 8/2001 Takashima et al. ....... 180/65.21
6,382,335 B2 * 5/2002 Takashima et al. ..... 180/65.235
6,925,369 B2 * 8/2005 Obayashi et al. .............. 701/36

(Continued)

FOREIGN PATENT DOCUMENTS

JP    2007269255 A * 10/2007
JP    2007269256 A * 10/2007
JP    2007269257 A * 10/2007

*Primary Examiner*—Mark Hellner
*Assistant Examiner*—Ari M Diacou
(74) *Attorney, Agent, or Firm*—Muncy, Geissler, Olds & Lowe, PLLC (57) ABSTRACT

A vehicle hybrid power system is provided according to the present invention. The hybrid power system is characterized by applying the concept of minimum equivalent fuel consumption, and then simulating equivalent fuel consumptions based on respective energy consumption or increase of motor and generator of a motor vehicle, and also defining simulated equivalent fuel consumption formula and making a list of system state parameters, system control parameters, and system negative load parameters, thereby obtaining simulated equivalent fuel consumption multidimensional data by entering the system parameters derived from a discretization/transformation process in the defined simulated equivalent fuel consumption formula; wherein, the simulated equivalent fuel consumption multidimensional data are revised to comprise subsystems, such as system engine, motor, generator, and others to determine a system control strategy of holistic optimization, thereby achieving the objective of saving energy. The present invention further provides a method for creating simulated equivalent fuel consumption multidimensional data, which is applicable to the hybrid power system of the present invention.

10 Claims, 5 Drawing Sheets

U.S. PATENT DOCUMENTS

| | | | |
|---|---|---|---|
| 7,565,942 B2* | 7/2009 | Shibata et al. | 180/243 |
| 2003/0144779 A1* | 7/2003 | Obayashi et al. | 701/36 |
| 2007/0205030 A1* | 9/2007 | Shibata et al. | 180/65.2 |
| 2008/0059013 A1* | 3/2008 | Liu et al. | 701/22 |
| 2008/0215199 A1* | 9/2008 | Aoyama et al. | 701/22 |
| 2009/0125172 A1* | 5/2009 | Matsubara | 701/22 |

\* cited by examiner

VEHICLE HYBRID POWER SYSTEM AND METHOD FOR CREATING SIMULATED EQUIVALENT FUEL CONSUMPTION MULTIDIMENSIONAL DATA APPLICABLE THERETO

BACKGROUND OF THE INVENTION

1. Field of the Invention

This invention generally relates to a vehicle hybrid power system and method for creating simulated equivalent fuel consumption multidimensional data applicable thereto, and, more specifically, to a hybrid power system that is capable of optimizing the system control strategy by applying its created simulated equivalent fuel consumption multidimensional data, and further controlling actions over subsystems, such as the engine, motor, clutch, generator, and others.

2. Description of Related Art

In response to soaring international oil prices and the fact that environmental concerns in a time of increasing global awareness are leading to demands for optimal fuel consumption, the automobile industry is aggressively developing vehicles possessing the benefits of reduced energy consumption, reduced pollution, and cleaner power sources. Moreover, in that motors are characterized with high torque at low rotation speeds and in that engines are characterized with high efficiency and low pollution at high rotation speeds, the automobile industry is pursuing the development of hybrid power systems that utilizes both motors and engines operating together or separately to provide optimal movement and operation of vehicles.

Figure 1A:
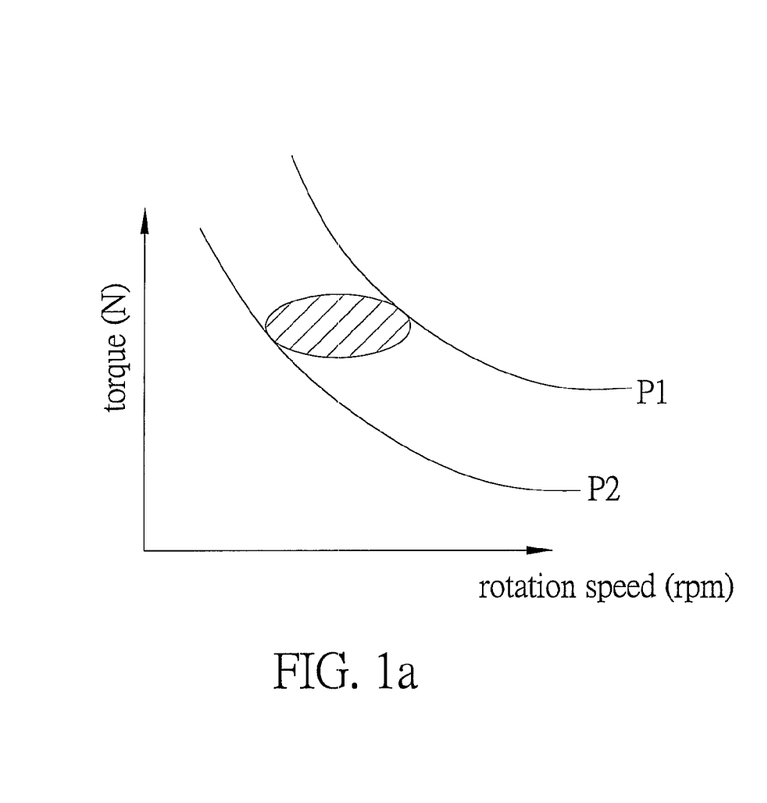
Figure 1B:
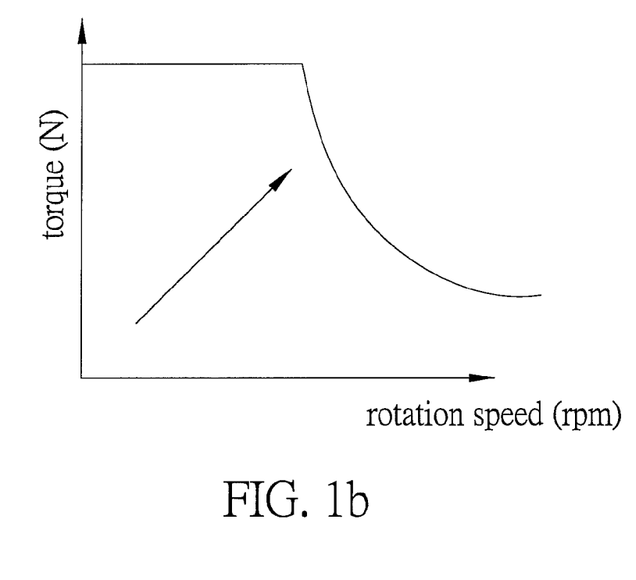

Control over the operational mode of a hybrid power system can generally be achieved by combining engineering experience and theoretical analysis. Utilizing engineering experience, control can be achieved by directly studying stability performance diagrams for the comprised subsystems, such as the engine, motor, battery, and then deciding the appropriate work zone for each of the power sources available as well as defining the switching conditions used to transition from one power source to another. FIG. 1a is a contour diagram of the brake specific fuel consumption (BSFC) of an engine, which is a measure of an engine's efficiency calculated by dividing the fuel consumption rate by the generated power. In the figure, the oval area is the preferred operating zone in terms of engine efficiency, wherein identically-shaped power efficiency curves P1 and P2 are determined at tangent points on the preferred efficiency zone. When output power efficiency is below power efficiency curve P2, a hybrid vehicle's electrical motor is employed as the vehicle's power source because an engine has poor rotational efficiency under this situation. When output power efficiency falls between the power efficiency curves P1 and P2, a hybrid vehicle's engine is employed as the vehicle's power source because the engine has preferable rotational efficiency under this situation. Lastly, when output power efficiency is above the power efficiency curve P1, both the engine and the electrical motor are employed as the vehicle power source, thereby outputting higher power efficiency. As shown in FIG. 1b, which is a relation diagram of equal efficiency while a motor is operating, the preferable state of motor operation is illustrated as equal efficiency curve E1. However, in regards to FIGS. 1a and 1b, engineering experience defines the operational zones of each subsystem based on only direct engineering observation rather than overall analysis. Therefore, this method is incapable of providing a holistic relation among each of the comprised subsystems of a vehicle. For example, if the motor is selected as the power source based on the data shown in FIG. 1a, the rotation speed and torque of the motor are not necessarily in the optimal state for motor operation as shown in FIG. 1b.

Therefore, when engineering experience is applied to a sophisticated system, a tiresome process of trial-and-error must keep testing and adjusting system parameters or work zones of subsystems, and the results derived from the process of trial-and-error are only local optimizations. In other words, direct observation of engineering experience is incapable of providing a sophisticated hybrid power system with a holistic optimization control strategy over each of various subsystems.

Another method to design a hybrid power system is by theoretical analysis. Using this method, a vehicle model must be built using mathematical theory. However, since the methods resulting from theoretical analysis are generally complicated and computationally intensive, such theoretical analysis cannot easily be applied to a vehicle in real-time for the purpose of operational control. Instead, a simplified model must be developed by first using off-line analysis, and then determining a rule-based control system after observing or inducting performance at each operational point. Then, system parameters and work zones for various subsystems can be adjusted based on this rule-based control system. The techniques utilized to implement the models resulting from such theoretical analysis are based on, for example, curve-fitting, "if-then-else" constructs, flowcharts, neural networks, and fuzzy logic, to name some of the more common techniques.

With regard to vehicle control, a prior applied method of theoretical analysis involves first imputing data for a vehicle and related driving test data. Next, build a first-approximation vehicle model, and then input theoretical controls into the vehicle model for dynamic analysis to obtain evaluation results. Then, transfer the evaluation results to a kinetic distribution diagram by dot-plotting, and, after that, an operational curve can be derived from the kinetic distribution diagram by curve fitting, thereby achieving the objective of "normalization." Lastly, the results from the normalization process are then copied to or implemented in a vehicle control unit (VCU), thus completing the on-line (real-time) control strategy.

However, a power system for a hybrid vehicle is a complex system that integrates various subsystems, such as the engine, motor, battery/generator, and transmission mechanisms. Therefore, such a huge typically requires a long time to build its model, and if a precise evaluation of the system dynamics is expected, such a system model should be one of higher order. Likewise, the efficacy of such a system model cannot be proven until much experimental comparison has been done. Moreover, in the subsequent processes of analyzing and drafting the control strategy, since simulated analysis of a higher-order vehicle model generally takes a relatively long period of time, in practice, only the first order vehicle model is applied to simulated analysis for the purpose of greatly speeding up the simulated operations. However, since a first order vehicle model cannot closely represent the actual state of a vehicle actual, the results derived from such a simulated analysis based on a first order vehicle model have low precision, and the control strategy determined by the result has low accuracy or reliability as a consequence.

Hence, it is a highly urgent issue in the industry to provide a technique that is capable of determining optimized control parameters for hybrid vehicle operational control, and further controlling operation of the engine, motor, clutch, generator, etc. based on such parameters, consequently achieving the objective of reducing system fuel consumption to a minimum and effectively solving the drawbacks of the prior arts, in which trial-and-error engineering experience and first-order theoretical analysis cannot effectively establish an optimized control strategy.

SUMMARY OF THE INVENTION

In view of the disadvantages of the prior art mentioned above, it is a primary objective of the present invention to create simulated equivalent fuel consumption multidimensional data for the purpose of dramatically reducing the control strategy analysis time.

It is another objective of the present invention to create simulated equivalent fuel consumption multidimensional data for the purpose of dramatically enhancing control strategy precision.

It is a further objective of the present invention to create simulated equivalent fuel consumption multidimensional data for the purpose of establishing a control strategy of holistic optimization.

To achieve the aforementioned and other objectives, a hybrid power system applicable to a vehicle is provided according to the present invention. The hybrid power system comprises: a battery, which is for providing electrical power in the system; a motor, which is powered by the power provided by the battery, the motor converting electrical energy to mechanical energy to move the vehicle; a fuel-burning engine, the engine converting chemical energy into mechanical energy used to move the vehicle and/or drive a generator to produce electrical energy; a generator, which is driven by the engine to generate electricity for charging the battery; a clutch, which is for engaging or disengaging the engine and/or the motor from the vehicle's power train; a power output unit, which outputs power provided by the engine and the motor; a memory unit, which is for saving simulated equivalent fuel consumption multidimensional data derived from minimum and maximum physical allowed values of at least system control parameters, system state parameters, and system negative load parameters; a system parameter detection unit, which is for detecting at least system the state parameters and system negative load parameters; and a vehicle control unit, which is loaded with the parameters detected by the system parameter detection unit, and which also, based on the loaded system state parameters and system negative load parameters, draws out minimum simulated equivalent fuel consumption and its corresponding system control parameters from the simulated equivalent fuel consumption multidimensional data that is saved in the memory unit, thereby being able to efficiently control the actions of the engine, the motor, the clutch, and the generator respectively based on the system control parameters.

In the system described above, the system control parameters comprise at least: torque values including engine output, motor input and output to the generator, and the rotation speeds of the engine, motor and generator; and the system state parameters comprise: the state of charge (SOC) of the battery, engine fuel consumption efficiency determined by the engine output torque and the rotation speed, the equivalent fuel consumption efficiency of the motor, the equivalent fuel consumption efficiency of the generator, a penalty factor for the generator to charge the battery, a penalty factor for the battery power consumption for the motor, and the system output rotation speed; and the system negative load parameters comprise at least: the system negative load torque.

In addition, in order to create the simulated equivalent fuel consumption multidimensional data saved in the memory unit, the present invention defines a simulated equivalent fuel consumption formula, wherein the method for creating the simulated equivalent fuel consumption multidimensional data comprises: (1) inputting the minimum and maximum physical allowed values for the system control parameters, system state parameters, and system negative load parameters, and then performing a discretization process on these system parameters within the scope of said allowed values; (2) entering these system parameters derived from the discretization process into said defined simulated equivalent fuel consumption formula, thereby creating the simulated equivalent fuel consumption multidimensional data.

The present invention is characterized by first defining an equivalent fuel consumption formula, and further obtaining simulated equivalent fuel consumption multidimensional data, wherein, in that the derived result is multidimensional data, the result is capable of being directly loaded into the vehicle control unit without the need of going through any normalization process, and no additional information is required, thereby dramatically decreasing the analysis time of establishing a control strategy, thus effectively overcoming drawbacks existing in the prior art, wherein theoretical analysis is applied and much time is required to build a vehicle model and the normalization process.

In addition, the simulated equivalent fuel consumption multidimensional data of the present invention is created by inputting system parameters derived from a discretization process into the equivalent fuel consumption formula, thereby acquiring more precise control parameters, and accordingly effectively overcoming the drawback of low reliability of control parameters shown by prior art.

Furthermore, the simulated equivalent fuel consumption multidimensional data of the present invention also takes subsystems, such as the engine, motor, generator, etc, into consideration, thereby establishing a control strategy of holistic optimization, and effectively overcoming the drawback of establishing a control strategy of local optimization as in prior art, which principally utilized trial-and-error experience.

BRIEF DESCRIPTION OF DRAWINGS

The present invention can be more fully understood by reading the following detailed description of the preferred embodiments, with reference made to the accompanying drawings, wherein:

FIG. 1$a$ is a contour diagram of brake specific fuel consumption (BSFC);

FIG. 1$b$ is a relation diagram of equal efficiency while the motor is operating;

DETAILED DESCRIPTION OF PREFERRED EMBODIMENTS

The following illustrative embodiments are provided to illustrate the disclosure of the present invention. These and other advantages and effects can be readily understood by those in the art after reading the disclosure of this specification. The present invention can also be performed or applied by other differing embodiments. The details of the specification may be changed on the basis of different points and applications, and numerous modifications and variations can be devised without departing from the spirit of the present invention.

The present invention is capable of overcoming drawbacks existing in the prior art, wherein engineering experience and/or theoretical analysis is applied that is incapable of effectively defining a control strategy for holistic optimization. The present invention applies the concept of minimum equivalent fuel consumption to a hybrid vehicle's power system, wherein the system is characterized by simulating the equivalent fuel consumption based on consumed or supplied power of the motor and generator, respectively, and then defining a simulated equivalent fuel consumption formula, thereby enabling system parameters derived from a discretization process to be entered into the simulated equivalent fuel consumption formula, and accordingly creating simulated equivalent fuel consumption multidimensional data, wherein, the simulated equivalent fuel consumption multidimensional data also takes subsystems, such as the engine, motor, generator, etc., into consideration. Therefore, a control strategy of holistic optimization is obtainable via said multidimensional data in order to accordingly achieve the objective of reducing system fuel consumption to a minimum.

Figure 2:
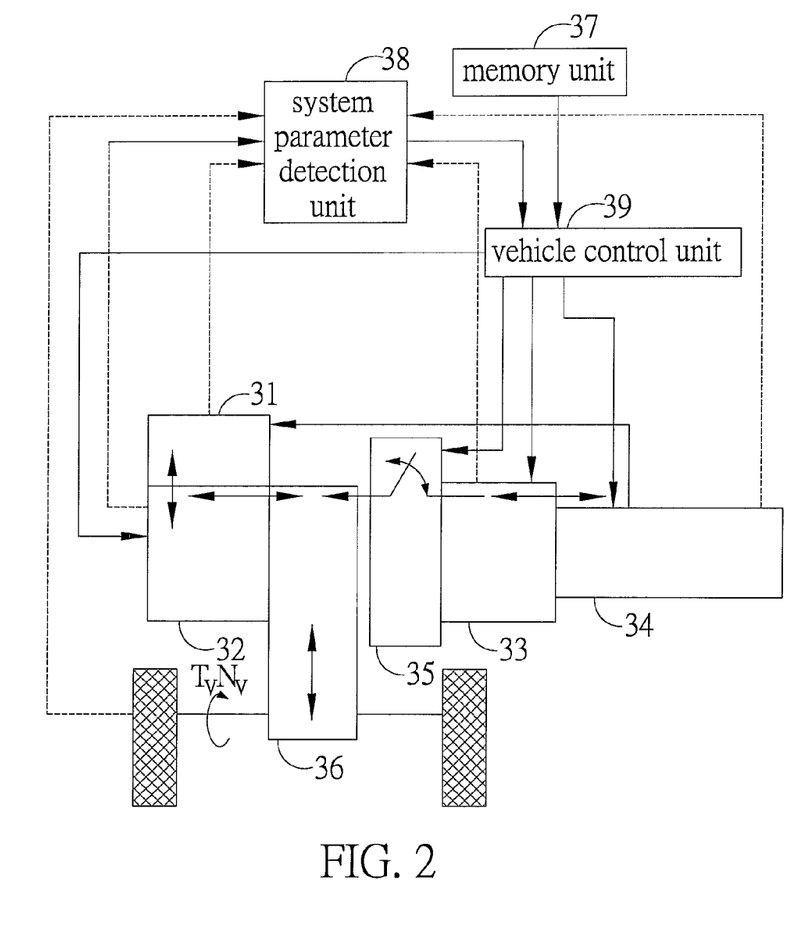
FIG. 2 is a diagram of the hybrid power system of the present invention.

FIG. 2 is a diagram of the hybrid power system for a vehicle of the present invention. The hybrid power system for a vehicle of the present invention comprises: a battery 31, which provides electrical power in the system; a motor 32, which is powered by the electrical power provided by the battery 31 to generate mechanical power to move the vehicle; an engine 33, which is operated by burning fuel to generate mechanical power to move the vehicle; a generator 34, which is driven by the engine 33 to generate electrical power for charging the battery 31; a clutch 35, which is for engaging and disengaging the engine 33 and/or the motor 32, wherein the clutch 35 can be an electrically moved clutch, but is not restricted to that implementation; a power output unit 36, which is for outputting power provided by the engine 33 and/or the motor 32, wherein the power output unit 36 can be a transmission box, but is not restricted to that implementation; a memory unit 37, which is for saving simulated equivalent fuel consumption multidimensional data derived from minimum and maximum physically allowed values of at least system control parameters, system state parameters, and system negative load parameters; a system parameter detection unit 38, which is for detecting at least system state parameters and system negative load parameters; and a vehicle control unit 39, which is for receiving parameters detected by the system parameter detection unit 38 and also from the simulated equivalent fuel consumption multidimensional data saved in the memory unit 37, acquiring minimum simulated equivalent fuel consumption and its corresponding system control parameters based on the received system state parameters and system negative load parameters, and then further controlling the actions of the motor 32, the engine 33, the clutch 35, and the generator 34 based on said acquired system control parameters.

The aforesaid system control parameters comprise at least: torque values including engine output, motor output and input to the generator, and the rotation speeds of the engine, motor, and generator; and the system state parameters comprise at least: the state of charge (SOC) of the battery, the engine fuel consumption efficiency that is determined by the engine output torque and rotation speed, the equivalent fuel consumption efficiency of motor, the equivalent fuel consumption efficiency of the generator, a penalty factor for the generator to charge the battery, a penalty factor for the battery consumption of the motor, and a system output rotation speed; and the system negative load parameters comprise at least: a system negative load torque.

According to the present invention, the memory unit 37, the system parameter detection unit 38, and the vehicle control unit 39 determine a control strategy for the current vehicle operational mode. When the vehicle is to be in the engine-powered operational mode, the vehicle control unit 39 will issue commands to have the clutch 35 disengage the motor 32 from the engine 33, wherein, at this moment, the motor 32 is responsible for outputting vehicle negative load torque, while the engine 33 is independently operating within the preferable efficiency zone and also potentially driving the generator 34 to charge the battery 31. Alternately, when the vehicle is to be in an operational mode of parallel connection—receiving power from both the engine and the motor—the vehicle control unit 39 will issue commands to have the clutch 35 engage the motor 32 with the engine 33, wherein, at this moment, vehicle negative load torque is provided by both the engine 33 and the motor 32.

The following expressions give relations for the torques and rotation speeds of the various subsystems of a vehicle in various operational modes:

In the operational mode of a single power source connection (engine or motor only):

$$T_m = T_v, N_m = N_v;$$

$$T_m = T_v, T_e = T_{ISG}, N_e = N_{ISG};$$

In the operational mode of parallel connection (both engine and motor):

$$T_v = T_e - T_{ISG} + T_m;$$

$$N_V = N_M = N_E = N_{ISG};$$

wherein, $T_m$ is motor output torque, $T_v$ is system negative load torque, $T_e$ is engine output torque, $T_{ISG}$ is generator input toque, $N_m$ is motor output rotation speed, $N_v$ is system output rotation speed, $N_e$ is engine output rotation speed, and $N_{ISG}$ is generator input rotation speed.

In order to create simulated equivalent fuel consumption multidimensional data that are to be saved in the memory unit 37, the present invention defines a simulated equivalent fuel consumption, which comprises:

$$\dot{m}_{EF} = \dot{m}_e - PF_{ISG} \times \dot{m}_{ISG} + PF_m \times \dot{m}_m$$

$$\dot{m}_e = BSFC_e(T_e, N_e) \times (T_e \times N_e)$$

$$\dot{m}_m = mBSFC_m \times (T_m \times N_m)$$

$$\dot{m}_{ISG} = mBSFC_{ISG} \times (T_{ISG} \times N_e)$$

wherein, $\dot{m}_{EF}$ is the system simulated equivalent fuel consumption required by the system for providing system negative load torque;

$\dot{m}_e$ is the engine fuel consumption required by the engine for providing engine output torque;

$\dot{m}_m$ is the motor simulated equivalent fuel consumption required by the motor for providing motor output torque;

$\dot{m}_{ISG}$ is the generator simulated equivalent fuel consumption required for inputting torque to the generator;

$BSFC_e (T_e, N_e)$ is the engine fuel consumption efficiency determined by the engine output torque and rotation speed;

$mBSFC_m$ is the equivalent fuel consumption efficiency of the motor;

$mBSFC_{ISG}$ is the equivalent fuel consumption efficiency of the generator;

$PF_{ISG}$ is the penalty factor for the generator to charge the battery;

$PF_m$ is the penalty factor for the battery consumption to power the motor;

Furthermore, $PF_{ISG}$ and $PF_m$ are related to the state of charge (SOC) of the battery. While the SOC is extremely low, battery discharging efficiency is low, and, during this time, the $PF_m$ value will increase and meanwhile bring up the overall simulated equivalent fuel consumption, thereby causing the engine to increase output torque to drive the generator to charge the battery to increase the state of charge (SOC). Conversely, while the SOC is high, said battery charging efficiency is low as well, and, during this time, the $PF_{ISG}$ value will decrease and meanwhile bring up the overall simulated equivalent fuel consumption, thereby causing the engine to stop outputting the increased torque that is for driving the generator to charge the battery.

Figure 3:
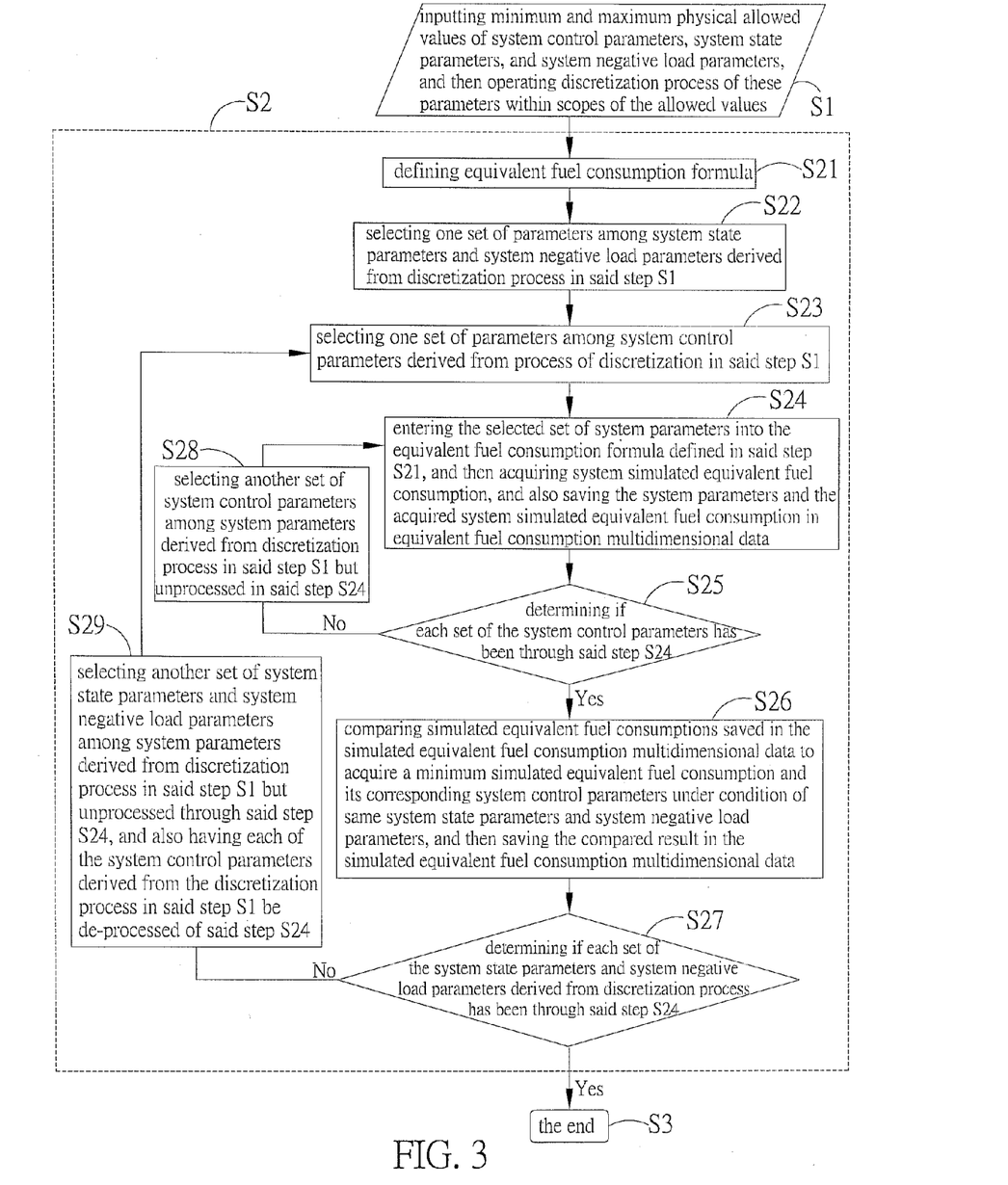
FIG. 3 is a flowchart showing the method of generating the simulated equivalent fuel consumption multidimensional data of the present invention.

The abovementioned simulated equivalent fuel consumption formulas are applicable to acquiring simulated equivalent fuel consumption multidimensional data applicable to the hybrid power system for a vehicle of the present invention. As shown in FIG. 3, the method for creating the simulated equivalent fuel consumption multidimensional data of the present invention comprises the following steps: first, in step S1, input the minimum and maximum physical allowed values for the system control parameters, system state parameters, and system negative load parameters, and then perform a discretization process on these system parameters within the scope of the allowed values, allowing the system parameters to be represented as a plurality of sets of parameters at suitable intervals within the scope of the physically allowed values; next, in step S2, enter these sets of parameters derived from the discretization process into a pre-defined equivalent fuel consumption formula for creating a set of simulated equivalent fuel consumption multidimensional data.

In addition, step S2 further comprises the following sub-steps: first, in step S21, define the pre-defined equivalent fuel consumption formula; next, proceed to step S22.

In step S22, select a set of parameters among the system state parameters and the system negative load parameters derived from said discretization process in step S1; then, proceed to step S23.

In step S23, select a set of parameters among the system control parameters derived from said discretization process in step S1; then, proceed to step S24.

In step S24, enter the selected set of system parameters into the equivalent fuel consumption formula defined in step S21, and accordingly acquire the system simulated equivalent fuel consumption, and also save the system parameters and the acquired system simulated equivalent fuel consumption in the equivalent fuel consumption multidimensional data; next, proceed to step S25.

In step S25, determine if each set of all the system control parameters has been through step S24; and, if yes, proceed to step S26; or, otherwise, proceed to step S28.

In step S26, compare the simulated equivalent fuel consumptions saved in the simulated equivalent fuel consumption multidimensional data, and then acquire a minimum simulated equivalent fuel consumption and its corresponding system control parameters under the condition of the same system state parameters and system negative load parameters, and then save the compared result in the simulated equivalent fuel consumption multidimensional data.

In step S27, determine if each set of all the system state parameters and the system negative load parameters derived from the discretization process has been through step S24; and, if yes, proceed to step S3, thus completing the process of creating the simulated equivalent fuel consumption multidimensional data; or, otherwise, proceed to step S29.

In step S28, select another set of system control parameters among the system parameters that are derived from the discretization process in step S21 and unprocessed through step S24; and then proceed to step S24.

In step S29, select another set of system state parameters and system negative load parameters among the system parameters derived from the discretization process in step S1 and unprocessed in step S24, and also have each set of the system control parameters derived from the discretization process in step S1 be de-processed of said step S24; and then proceed to said step S23.

Furthermore, in the method of creating the equivalent fuel consumption multidimensional data, the system control parameters comprise at least: torque values for engine output, motor output and input to the generator, and rotation speeds of the engine and motor; and the system state parameters comprise at least: the state of charge (SOC) of the battery, engine fuel consumption efficiency decided by engine output torque and rotation speed, equivalent fuel consumption efficiency of the motor, equivalent fuel consumption efficiency of the generator, a penalty factor for the generator to charge the battery, which is in direct proportion to state of charge of battery, a penalty factor for battery consumption to power the motor, which is in inverse proportion to the state of charge of the battery, and system output rotation speed; and the system negative load parameters comprise at least: system negative load torques.

Figure 4:
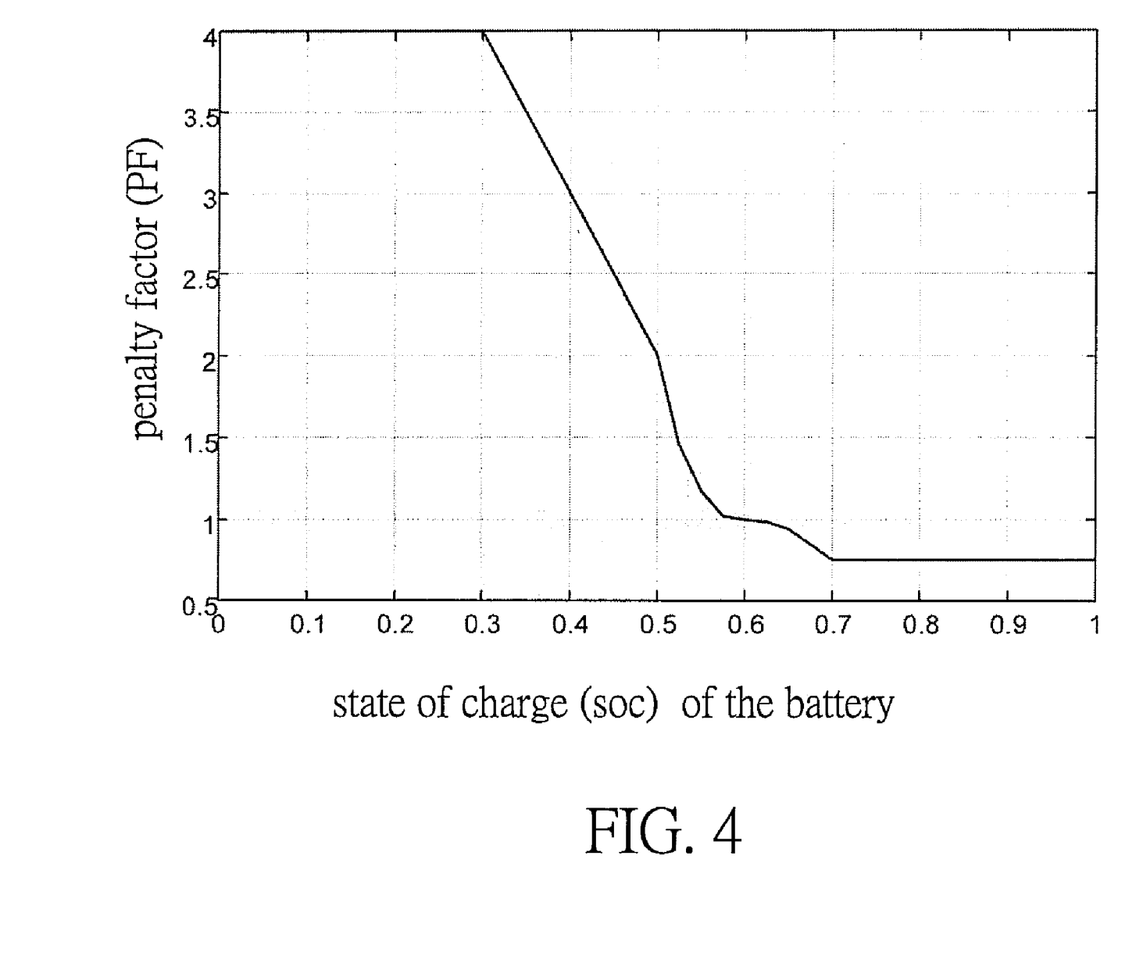
FIG. 4 is a relation diagram of the penalty factors for the motor and generator.

FIG. 4 is a relational diagram of the penalty factors of the motor and generator. Referring to the figure, when the motor is operating within the zone of a low state of battery charge, its simulated equivalent fuel consumption increases as a result of the fairly low battery discharging efficiency; and, if the generator is generating electricity within the zone of a high state of battery charge, since the battery discharging efficiency is pretty low as well, its simulated equivalent fuel consumption increases likewise. According to the aforementioned tendency, the simulated result will not be prone to an operational mode of a single power source connection or a parallel connection while keeping the power balance.

Figure 5:
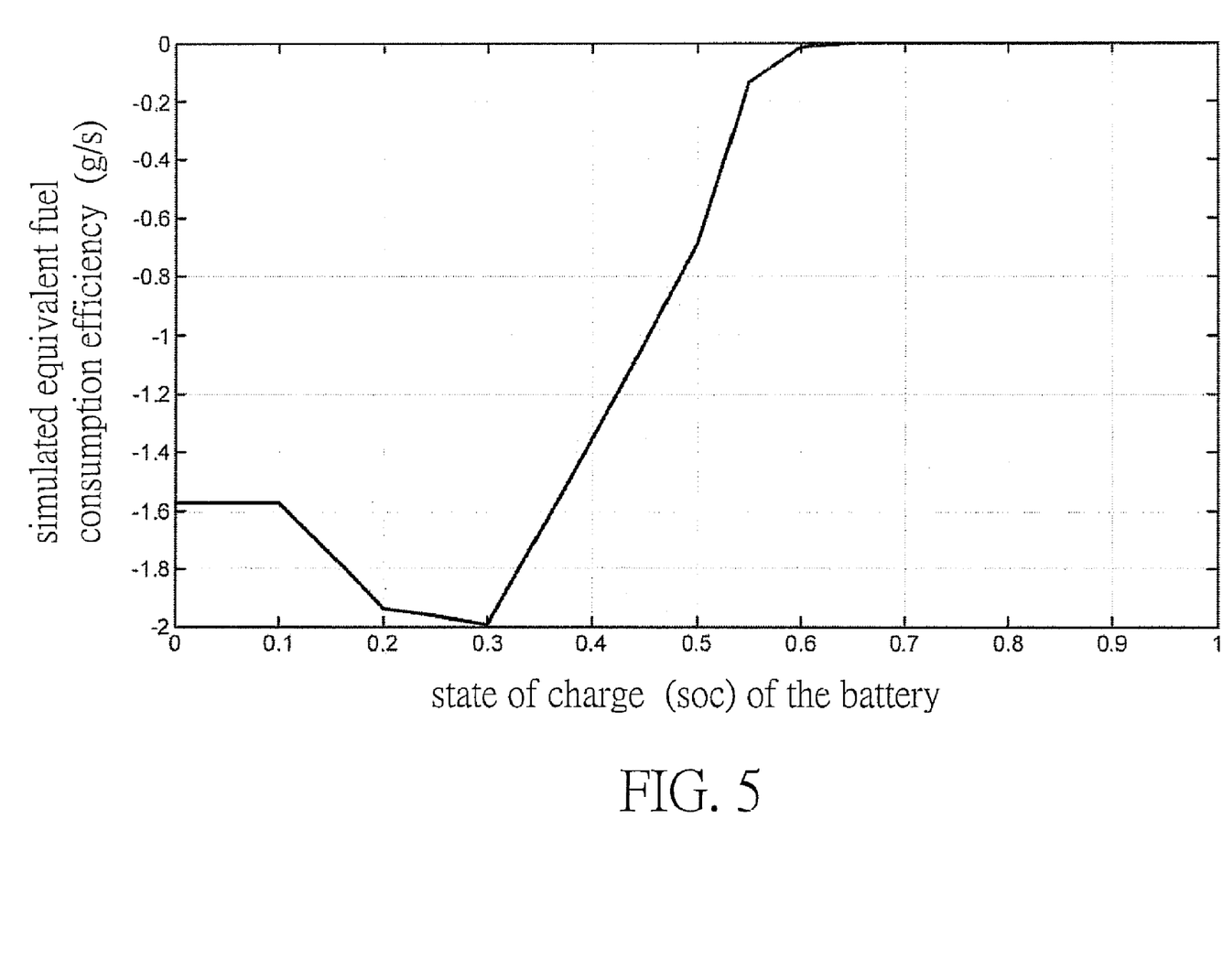
FIG. 5 is a relation diagram of simulated equivalent fuel consumption, wherein the generator is driven by the engine to charge the battery at various states of charge in an operational mode of a single power source connection.

FIG. 5 is a relational diagram of simulated equivalent fuel consumption, wherein the generator is driven by the engine to charge at various situations of state of charge (SOC) of the battery in an operational mode of a single power source connection. Referring to the figure, when the state of charge is greater than 0.7, since the vehicle control unit determines that the charging efficiency is poor based on the penalty factor for the generator to charge the battery, the vehicle control unit issues a command to stop the engine from operating, thereby achieving the objective of saving fuel by shutting off the engine.

The following are features of the actions of the hybrid power system of the present invention:

In the situation of a low system negative load torque $T_v$ and a low state of charge (SOC), the ratio of engine output torque $T_e$ to the system negative load torque $T_v$ is far greater than 1. During such a time period, the engine is driving the generator to charge the battery and operating the vehicle with excessive torque, much like driving in low gear on flat ground. Similarly, while the system negative load torque $T_v$ and state of charge (SOC) are increasing gradually, the ratio of the engine output torque $T_e$ to the system negative load torque $T_v$ is gradually decreasing to less than 1. During this time period, the motor starts to assist engine by outputting torque.

When the system negative load torque $T_v$, is at a lower value, basically, the engine output torque $T_e$ is changing along with the state of charge (SOC). For example, when the state of charge is at a lower value, the engine output torque $T_e$ is higher for the purpose of charging the battery, and while the state of charge is at high level, the engine output torque $T_e$ will be correspondingly decreased since there is no need to charge the battery. Moreover, when the system negative load torque $T_v$ is higher than the physically allowed maximum value of engine output torque $T_e$, the engine output torque $T_e$ has a corresponding relation with the engine output rotation speed $N_e$, instead of a direct relation with state of charge (SOC).

In the situation of low motor output torque $T_m$ and a low state of charge (SOC), the vehicle control unit will issue a command to have the engine charge battery, thereby decreasing the overall simulated equivalent fuel consumption. While the state of charge is gradually getting higher due to charging the battery, the vehicle control unit will correspondingly issue a command to have the engine stop operating and charging, thereby increasing the overall simulated equivalent fuel consumption. Additionally, when the motor output torque $T_m$ is increasing, since the motor output power efficiency increases gradually, the overall simulated equivalent fuel consumption will correspondingly increase. Furthermore, when the motor output rotation speed $N_m$ increases gradually, the overall simulated equivalent fuel consumption will correspondingly increase as well.

The operational mode of engine-only connection of the hybrid power system of the present invention is mainly utilized in a state of low system negative load torque $T_v$ and low state of charge (SOC), wherein, during this time, the engine is charging the battery to enable the battery to go back up quickly to and be safe at a higher state of charge (SOC). When the system negative load torque $T_v$ becomes higher than a certain threshold value, during this time, as opposed to operating in an engine-only connection mode, a parallel connection mode is utilized having a smaller simulated equivalent fuel consumption; therefore, the vehicle control unit will issue instructions to cause the vehicle to operate in the parallel connection mode. While the engine is rotating at a speed right above the minimum rotating speed, the vehicle control unit will select the operational mode of motor-only connection; that is, using that motor as only output power source.

The foregoing descriptions are optimized control strategies and relations for the output torques of various power sources of the hybrid power system of the present invention. Verification of such descriptions has been processed with a simple vehicle simulation formula, and acquired verification results are shown in Table 1:

TABLE 1

| | gas mileage (KmL$^{-1}$) | improvement rate (%) | fuel burned (g) |
|---|---|---|---|
| engine only | 19.09 | — | 51.8 |
| operational mode of parallel connection | 21.79 | 14.14 | 45.4 |
| Operational mode of solo/parallel connections | 28.20 | 47.72 | 35.0 |

In view of Table 1, the strategy of utilizing the operational mode of a solo-power connection according to the present invention is capable of increasing gas mileage from 19.09 to 21.79 km/L for an improvement rate of 14.14% and less fuel consumed; while the strategy of utilizing either the operational modes of either a single power source only or a parallel connection is capable of increasing gas mileage to 28.20 km/L for an improvement rate of 47.72% and an even lower fuel consumption.

The present invention is characterized by first defining an equivalent fuel consumption formula to further obtain simulated equivalent fuel consumption multidimensional data. Also, since the derived result is multidimensional data, which can be directly loaded into vehicle control unit without the need of going through any normalization process, no additional information is required, thereby dramatically decreasing the analysis time for establishing a control strategy, and effectively overcoming the drawbacks existing in the prior art, wherein theoretical analysis is adopted and a large amount of time is consumed in building a vehicle model and normalization process.

In addition, the simulated equivalent fuel consumption multidimensional data of the present invention is created by inputting system parameters derived from a discretization process into an equivalent fuel consumption formula, thereby obtaining more precise control parameters, and accordingly effectively overcoming the drawback of low reliability of control parameters as shown by prior art.

Furthermore, the simulated equivalent fuel consumption multidimensional data of the present invention also take subsystems, such as engine, motor, generator, etc, into consideration, thereby obtaining a control strategy of holistic optimization, and accordingly effectively overcoming the drawback of obtaining a control strategy of local optimization as shown by prior art, wherein a measure of engineering experience is applied.

The foregoing descriptions of the detailed embodiments are only illustrated to disclose the features and functions of the present invention and are not restrictive of the scope of the present invention. It should be understood to those in the art that many modifications and variations can be made according to the spirit and principles of the disclosure of the present invention and yet fall within the scope of the appended claims.

What is claimed is:

1. A method for controlling the components of a hybrid vehicle including a motor, an engine, a generator, and a clutch between a motor and engine by creating simulated equivalent fuel consumption multidimensional data, which comprises the following steps:

(1) inputting the minimum and maximum physically allowed values for the system control parameters, system state parameters, and system negative load parameters, and then performing a discretization process on these parameters within the scope of their allowed values;

(2) entering the system parameters derived from the discretization process into the following defined equivalent fuel consumption formulas for creating the simulated equivalent fuel consumption multidimensional data;

(3) controlling at least one of said components of said hybrid electric vehicle based on the simulated equivalent fuel consumption formulas; and (4) the equivalent fuel consumption formula being:

$$\dot{m}_{EF} = \dot{m}_e - PF_{ISG} \times \dot{m}_{ISG} + PF_m \times \dot{m}_m$$

$$\dot{m}_e = BSFC_e(T_e, N_e) \times (T_e \times N_e)$$

$$\dot{m}_m = mBSFC_m \times (T_m \times N_m)$$

$$\dot{m}_{ISG} = mBSFC_{ISG} \times (T_{ISG} \times N_e)$$

wherein, $\dot{m}_{EF}$ is the system simulated equivalent fuel consumption required by the system for providing the system negative load torque, $\dot{m}_e$ is the engine fuel consumption required by the engine for providing the engine output torque, $\dot{m}_m$ is the motor simulated equivalent fuel consumption required by the motor for providing the motor output torque, $\dot{m}_{ISG}$ is the generator simulated equivalent fuel consumption required for inputting torque to the generator, $T_e$ is the engine output torque, $N_e$ is the engine output rotation speed, $BSFC_e(T_e, N_e)$ is the engine fuel consumption efficiency determined by the engine output torque and rotation speed, $T_m$ is the motor output torque, $N_m$ is the motor output rotation speed, $mBSFC_m$ is the equivalent fuel consumption efficiency of the motor, $T_{ISG}$ is the generator input toque, $N_{ISG}$ is the generator input rotation speed, $mBSFC_{ISG}$ is the equivalent fuel consumption efficiency of the generator, $PF_{ISG}$ is the penalty factor for the generator to battery charge; and $PF_m$ is the penalty factor for the battery consumption on the motor.

2. The method for creating simulated equivalent fuel consumption multidimensional data of claim 1, wherein step (2) further comprises the following steps:

(A) defining the equivalent fuel consumption formulas;

(B) selecting a set of system state parameters and system negative load parameters among parameters derived from the discretization process in step (1);

(C) selecting a set of system control parameters among the parameters derived from the discretization process in step (1);

(D) entering the selected system parameters in the equivalent fuel consumption formula to obtain the system simulated equivalent fuel consumption, and then saving the entered system parameters and said obtained system simulated equivalent fuel consumption in the equivalent fuel consumption multidimensional data;

(E) determining if each of the system control parameters has been through step (D), and, if yes, proceeding to step (F); and otherwise, selecting another set of system control parameters among the system parameters that are derived from the discretization process in step (1) but unprocessed in step (D), and then proceeding back to said step (D);

(F) comparing the simulated equivalent fuel consumptions saved in the simulated equivalent fuel consumption multi-dimensional data to acquire the minimum simulated equivalent fuel consumption and its corresponding system control parameters under the condition of the same system state parameters and system negative load parameters, and then saving the compared result in the simulated equivalent fuel consumption multi-dimensional data; and (G) determining if each set of the system state parameters and system negative load parameters derived from said discretization process has been through step (D), and, if yes, the simulated equivalent fuel consumption multi-dimensional data has been created; or otherwise, selecting another set of system state parameters and system negative load parameters among the system parameters that are derived from said discretization process in step (1) but unprocessed in step (D), and also making each set of all the system control parameters derived from said discretization process be de-processed in step (D); and then proceeding back to step (C).

3. The method for creating a simulated equivalent fuel consumption multidimensional data of claim 2, wherein the system control parameters comprise at least: torque values including the engine output, and the motor output and input to the generator, as well as rotation speeds of the engine, the motor, and the generator.

4. The method for creating a simulated equivalent fuel consumption multidimensional data of claim 3, wherein the system state parameters comprise at least: the state of charge (SOC) of the battery; engine fuel consumption efficiency determined by the engine output torque and rotation speed; equivalent fuel consumption efficiency of the motor; equivalent fuel consumption efficiency of the generator; a penalty factor for the generator to the state of charge (SOC) of the battery, which is in a direct proportion to the state of charge (SOC) of the battery; a penalty factor for the motor battery consumption, which is in an inverse proportion to the state of charge (SOC) of the battery; and the system output rotation speed.

5. The method for creating a simulated equivalent fuel consumption multidimensional data of claim 4, wherein the system negative load parameters comprise at least: system negative load torque.

6. A vehicle hybrid power system, which comprises:

a battery, which is for providing electrical power;

a motor, which is driven by the electrical power provided by the battery;

an engine, which is driven by burning fuel;

a generator, which is driven by the engine to generate electricity, the generator being for charging the battery;

a clutch, which is for engaging or disengaging the motor and the engine such that they either separately or jointly power the vehicle;

a power output unit, which is for outputting power provided by the engine and the motor;

a memory unit, which is for saving simulated equivalent fuel consumption multi-dimensional data obtained via minimum and maximum physical allowed values of system control parameters, system state parameters, and system negative load parameters;

a system parameter detection unit, which is for detecting system state parameters and system negative load parameters; and a vehicle control unit, which is configured to perform the method of claim 1.

7. The vehicle hybrid power system of claim 6, wherein, the power output unit is a transmission box.

8. The vehicle hybrid power system of claim 6, wherein the system control parameters comprise at least: torque values including the engine output, the motor output and input to the generator, as well as the rotation speeds of the engine, the motor, and the generator.

9. The vehicle hybrid power system of claim 8, wherein the system state parameters comprise at least: the state of charge (SOC) of the battery; engine fuel consumption efficiency that is determined by engine output torque and rotation speed; equivalent fuel consumption efficiency of the motor; equivalent fuel consumption efficiency of the generator; a penalty factor for the generator to the state of charge (SOC) of the battery, which is in a direct proportion to the state of charge (SOC) of the battery; a penalty factor for the motor battery consumption, which is in an inverse proportion to the state of charge (SOC) of the battery; and the system output rotation speed.

10. The vehicle hybrid power system of claim 9, wherein the system negative load parameters comprise at least: a negative load torque.

* * * * *